Figure 1:
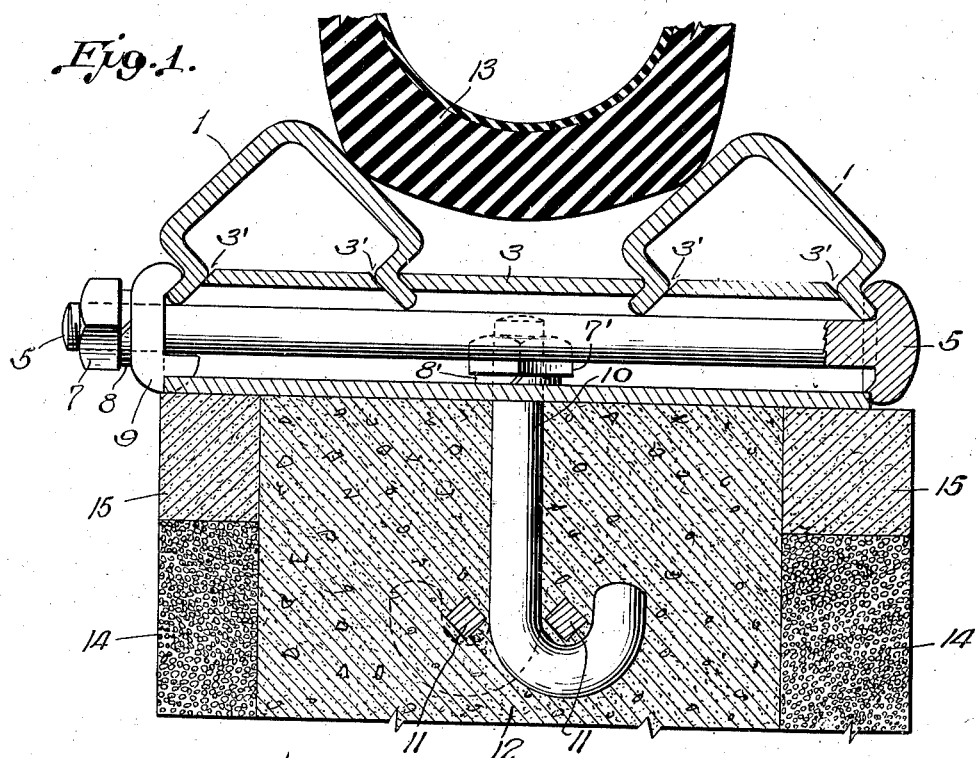

Aug. 23, 1938.	E. SCHMID	2,127,701
TRACK FOR HIGHWAYS
Filed March 9, 1937	3 Sheets-Sheet 1

Inventor:
Ernst Schmid

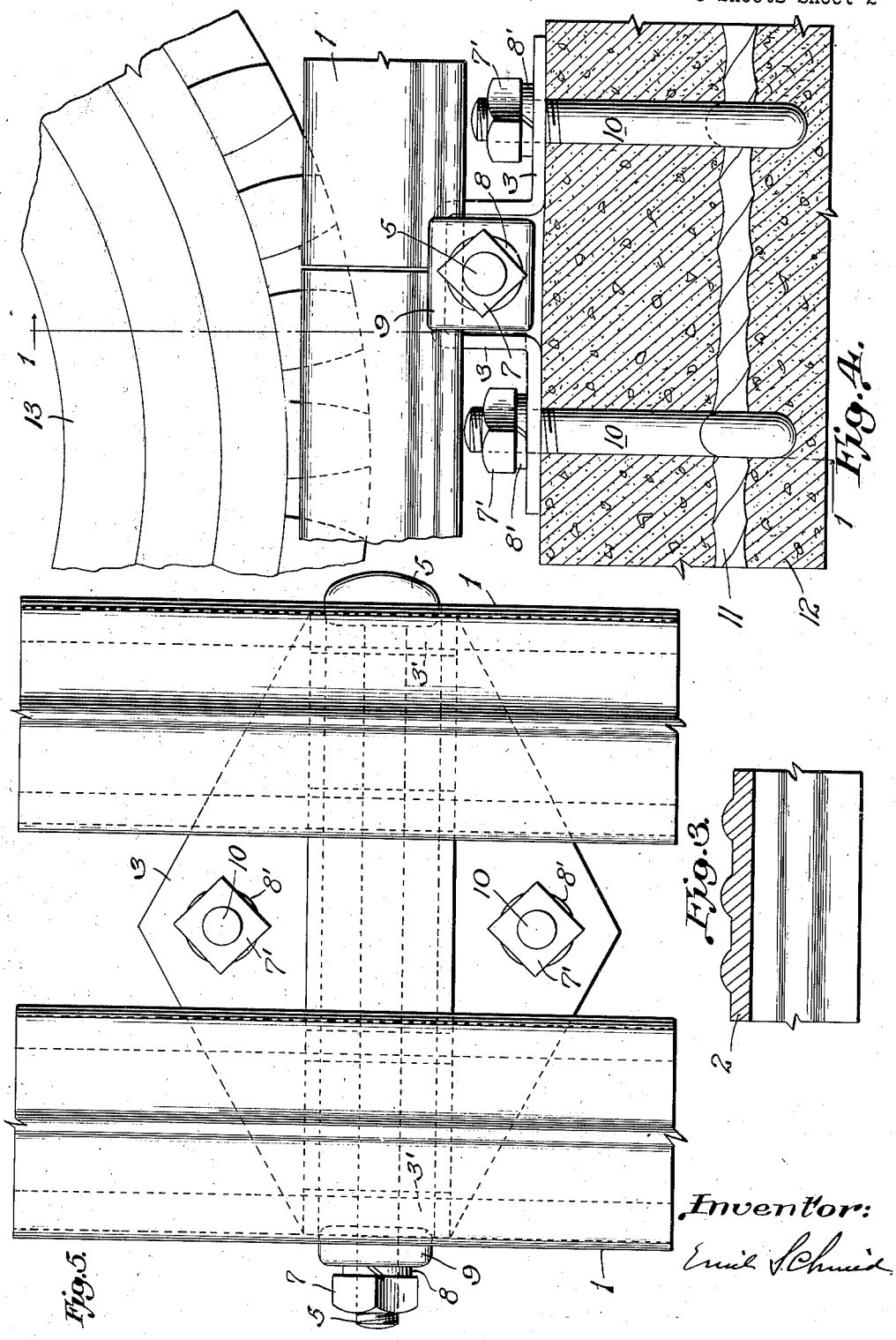

Aug. 23, 1938.　　　　　E. SCHMID　　　　2,127,701
TRACK FOR HIGHWAYS
Filed March 9, 1937　　　　3 Sheets-Sheet 3

Inventor
Emil Schmid

Patented Aug. 23, 1938

2,127,701

UNITED STATES PATENT OFFICE 2,127,701

TRACK FOR HIGHWAYS

Emil Schmid, Washington, D. C.

Application March 9, 1937, Serial No. 129,925

5 Claims. (Cl. 238—4)

My invention has for its object a suitable track for facilitating and safeguarding automobile travel on our highways. During the last decade three hundred thousand people were killed and more than a million were crippled for life in collisions on our highways. In spite of better roads, better automobiles and stricter regulations, the annual casualty list is steadily rising. An effective remedy for that appalling condition can be provided by the tracking of our highways, which would be of particular benefit in the congested arteries radiating from metropolitan centers.

In a track for that purpose it is of vital importance that provision be made for the rapid removal of rain-water or snow, which otherwise would render the track useless at the very time when it is needed most. I meet these requirements by elevating my rails a sufficient distance above the road, and by providing an open space of ample clearance between the steel sections forming the guide rail and the road surface. This assures the instant removal of water from the rails by natural drainage, it prevents the forming of ice on the runways, and it causes the rapid removal of snow from the guide rail by the action of the wheels on passing vehicles forcing the snow downward and outward through the spaces provided for that purpose.

It is another object of my invention to provide a guide rail in a track for highways which grips both edges of any size rubber tire evenly and thereby effectively prevents any side-swaying movement of the vehicle, regardless of the rate of speed at which it may be travelling. It is a further object in connection therewith to obtain traction in my guide rail by lateral compression of the tire rather than peripheral friction, which is the case when travelling on the surface of the road. I accomplish these objects by forming my guide rail of two inclined surfaces, with an open space between the two surfaces. This method of construction serves the dual purpose of assuring lateral compression in the smaller sizes of tires as well as in the larger sizes, and at the same time assuring the instantaneous drainage of the guide rail, which is essential for reasons set forth in the preceding paragraph.

It is a well known fact that the abrasive action of concrete rapidly destroys the tread of rubber tires at the higher speeds, whereas steel has no such abrasive action. For this reason I prefer to construct my flat rail as well as my guide rail of steel, and to obtain traction by means more effective and less destructive than road friction. In my guide rail I obtain traction by the lateral compression of the tire as pointed out before. In my flat rail I obtain traction by forming transversely running ridges on the surface of the rail.

By forming my guide rail of two downwardly inclined surfaces I gain the further advantage of utilizing that portion of the tread in a rubber tire which is ordinarily wasted, i. e. the outer edges, and preserving the central portion of the tread for travelling on my flat rail or on the untracked road, which amounts to an additional saving in rubber. The use of steel rails saves not only rubber, but also fuel, which is amply demonstrated by past experience in steam and electrical transportation.

It is another object of my invention to obtain all the elements which I consider essential in a track for highways in the most economical manner. Cost, after all, is the deciding factor which determines in a structure of this kind whether or not it is commercially possible, no matter how desirable it may be otherwise. For that reason all parts of my track are designed so as to give a maximum of strength and useful service at a minimum of cost. By forming my rails of semi-hollow members I obtain a structure of exceptional strength, rigidity and durability at a minimum of cost. By forming my guide rail of two reversible members I double their service capacity. My method of securing the rails to the road combines extreme simplicity with absolute security.

Figure 2:
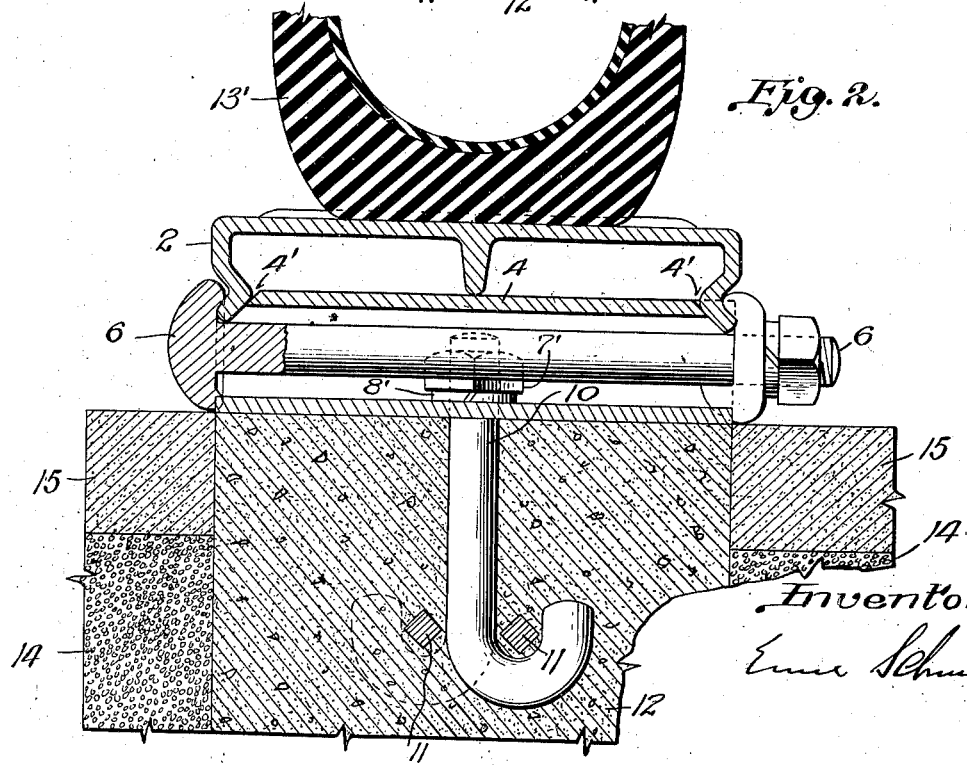
Figure 6:
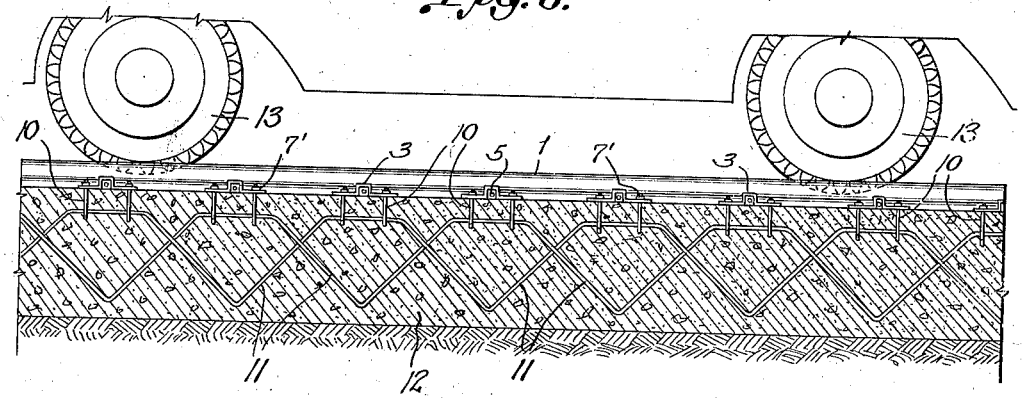
Figure 7:
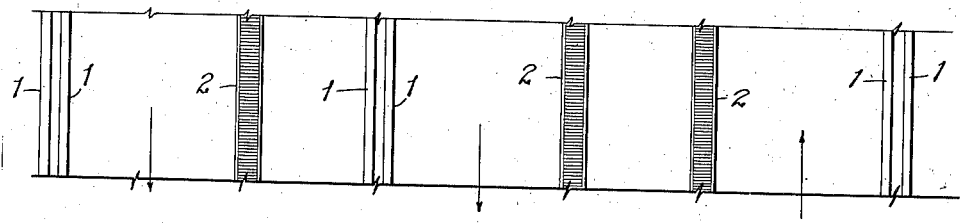
Figure 8:
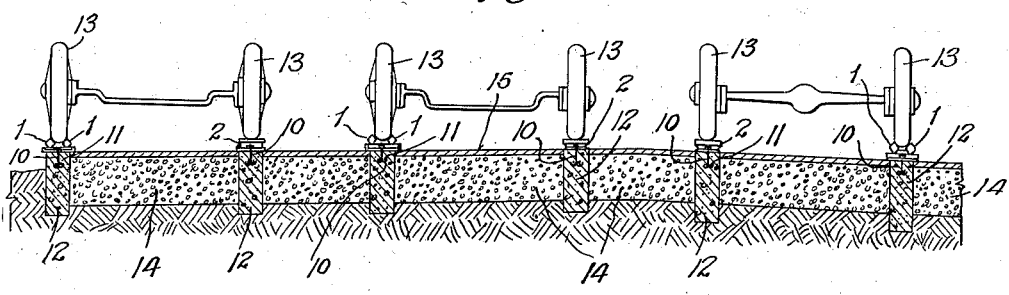

With these and other objects in view I refer now to the drawings in which like numerals indicate like parts in all the drawings. Figure 1 is a cross section through my guide rail at the line H in Figure 4. Figure 2 shows a cross section through flat rail 2 which runs parallel with guide rail 1. Figure 3 is a longitudinal section through rail 2. Figure 4 is a side view of guide rail 1. Figure 5 is a top view of guide rail 1. Figure 6 is a longitudinal section through the concrete base. Figure 7 is a plan view of a four track highway. Figure 8 is a transverse section through the same. The lock bolt 5 is shown partly in section and partly in elevation; anchor bolt 10, nuts 7 and 7', lock washers 8 and 8' and tie clip 9 are shown in elevation. The reversible semihollow rail members 1 are offset on their lower edges, and the offset portions are seated in seats 3', formed in the raised central portion of tie plate 3, which is secured to the concrete base 12 by means of anchor bolts 10, lock washers 8' and nuts 7', in the manner shown. The numerals 14 and 15 indicate parts of the road-bed which will be discussed hereinafter.

It will be noted that the normally rounded edges of tire 13 are compressed by the weight of the vehicle (not shown) so as to lie flat against the inclined surfaces of the rail sections 1. That flattening effect extends also and more pronouncedly so in the longitudinal direction of the rail. The downward and sideward acting pressure exerted by the weight of the vehicle is evenly distributed on the two inclined surfaces of the rail sections 1, which results in the perfect alignment of the wheels travelling in the guide rail, and perfect traction caused by the lateral compression of the tire, without impeding movement in longitudinal direction.

By offsetting the lower edges of the guide rail members 1 and seating them in the seats 3' in the raised central portion of tie plate 3 in the manner shown, I obtain a structure of great strength, absolute security, and yet of extreme simplicity. It will be readily conceived that the rail members 1 cannot leave their seats 3' even with the lateral bolt 5 completely removed. The combined safety features of lock washer 8, tie clip 9 and nut 7, together with the spring action of the rail members 1 when under compression make the possibility of a bolt becoming loose extremely remote, but even then, as pointed out, no danger would be involved.

The major objects accomplished in my guide rail may be summed up as follows: First, I provide an extremely rigid rail with a minimum expenditure for material; second, I provide an ample drainage space within the runway, which is a prime requisite in a track of this kind, for reasons pointed out previously in this specification; third, it enables me to reverse the rail members 1 after their inner surfaces have become worn, and fourth, it enables me to tie the rail members 1 in their proper relation to each other and at the same time to the tie plate 3 which holds both of them to the road, by the single means of lateral bolt 5. The simple efficiency with which these essential requirements are met will be appreciated by anyone trained in the mechanical arts.

Figure 2 shows a cross section through the flat rail 2, which runs parallel with guide rail 1 and is spaced therefrom a distance of 57", measured from center to center of rail, which is the average spread of wheels in automobiles. The upper surface of this rail has transversely running ridges, more clearly shown in Figure 3, which is a longitudinal section through rail 2. The purpose of these ridges is to provide additional traction, since with a steel rail surface friction is not sufficient for that purpose. The fastenings holding rail 2 to the road are similar to the fastenings of guide rail 1.

Figure 4 is a side view of guide rail 1, with other parts shown partly in elevation and partly in section. This view shows the transversely raised central portion of tie plate 3 in my preferred rectangular form, which however may be triangular, semi-circular or any other suitable shape. This raised section serves the three fold purpose of elevating the rail above the road surface, of providing seats 3' for the offset lower edges of the rail members 1, and of providing a seat for the transversely acting lock bolt 5. Figure 4 shows also the simple method of joining the ends of rail members 1 by merely abutting them centrally above bolt 5, and locking them in position with bolt 5 the same as other parts of the rail. This view also shows the drainage clearance between the lower edges of rail members 1 and the road, and the clearance between the lowest point of the tire and the road, the importance of which has been pointed out before.

Figure 5 is a top view of guide rail 1 and tie plate 3, which in connection with the other views explains itself.

Figure 6 is a longitudinal section through the concrete base 12, showing in their relative positions the front and rear wheels of an automobile, guide rail 1, tie plates 3, anchor bolts 10 and re-inforcing rods 11. The connection of the various parts in the manner shown results in a trackway of exceptional strength.

Figure 7 is a part-plan of a four-track highway, and Figure 8 is a transverse section through the same, showing concrete bases 12 and rails 1 and 2 in their relative positions. The open spaces 14 between bases 12 may be filled with gravel and a light surfacing 15 of any suitable material, since they are not used for carrying traffic. It is also entirely feasible to sod the spaces 14 with grass and keep it trimmed to the level of bases 12, which would transform the highway into a thing of beauty indeed.

It will be noted that by using my tracks, thirty feet in width is sufficient for a four-lane highway, with ample clearance between passing vehicles. The saving in area, in foundation, in surfacing and in the up-keep of the road make up a considerable part of the cost of the tracks, and when we add to this the savings in rubber, in fuel, in time, and above all the saving in human life and property by preventing collisions, the economic advantage and the commercial possibility of a tracked highway cannot be well disputed.

Grade crossings offer no difficulty for the operation of a tracked highway. It would naturally be desirable to under-pass all but major crossings. At such, the tracks simply flare out and taper onto an untracked concrete square, and it is optional with the driver to cross over and enter the trackway again at the other side of the square, or turn right or left, subject of course to the signal system already in operation at such crossings. If the crossing highway is also tracked, the procedure will be the same.

A number of variations are possible within the scope and spirit of my invention. For instance, the ridged surface of my flat track 2 may be formed of a removable section so as to renew the same when worn smooth. It may also be found desirable to form similar ridges on the rail members 1 to improve traction on steep grades. My tracks may also be installed on existing highways with no other change than using suitable expansion bolts in place of anchor bolts 10 shown. Thus a track can be installed on the central part of a highway while the outer lanes may be left untracked. It is also practical to track dangerous curves in existing highways only, without tracking other parts. When it is desired to carry busses and trucks equipped with double rear tires, the rail members must naturally be constructed so as to accommodate double tires as well as single tires. Time and experience will teach further modifications, to all of which I now lay claim within the scope of this invention the same as if they had been fully disclosed herein.

I claim as my invention:

1. In a track for highways, a guide rail formed of two convergent downwardly inclined planar surfaces for supporting a resilient tire on its outer peripheral edges, a continuous open space between said surfaces enabling the central portion of the tire to yield to the pressure of the load bearing on the tire and to protrude downwardly in said open space, thus forming a wedge-like key between the inclined surfaces, for the purpose of holding the tire securely in its lateral position, and for the further purpose of checking any tendency of the tire to climb out of the guide rail while in motion.

2. In a track for highways, a guide rail as specified in claim 1, and an unobstructed drainage passage extending downwardly from the continuous open space between the inclined surfaces.

3. In a track for highways, a guide rail as specified in claim 1 in which the inclined surfaces are formed of two separate and reversible members.

4. In a track for highways, a guide rail as specified in claim 1, a tie plate secured to the road, a raised transverse section in said tie plate, seats formed in said transverse section for receiving the lower edges of the inclined surface members, and a transversely acting locking device for securing said inclined surface members to the tie plate and to each other in their relative position.

5. In a track for highways, a guide rail as specified in claim 1, and a parallel running flat rail, substantially as shown and described.

EMIL SCHMID.